May 16, 1961 — L. A. FOGALEY — 2,984,040
FLOAT FOR ADJUSTING FISHING DEPTH
Filed April 6, 1959
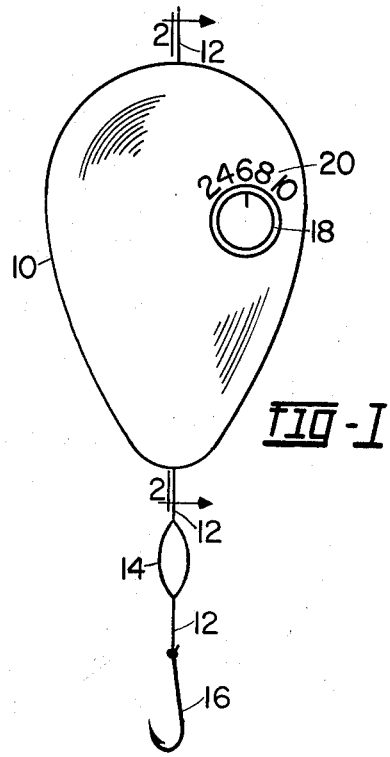
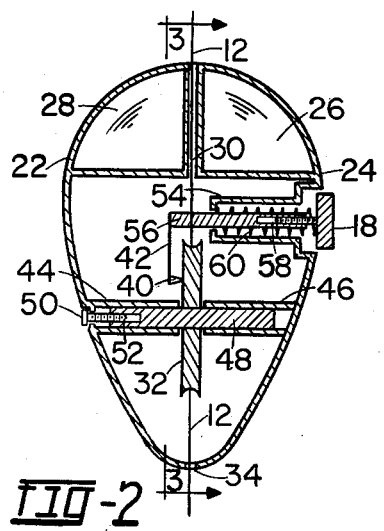
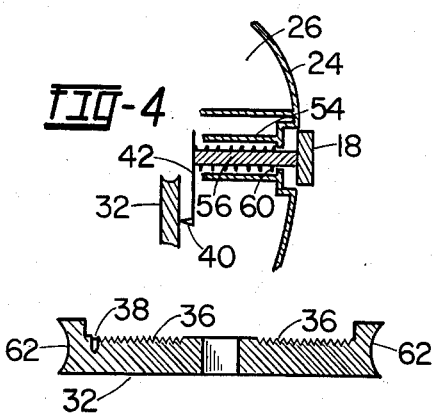
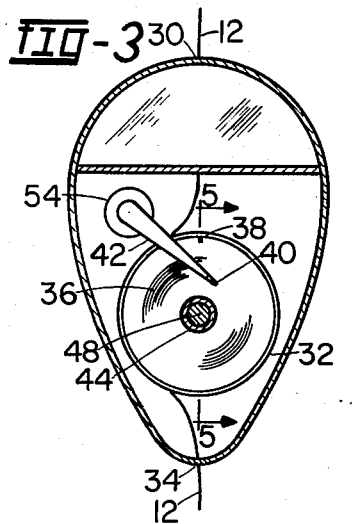
INVENTOR.
LOUIS A. FOGALEY
BY James R. Head United States Patent Office 2,984,040
Patented May 16, 1961

2,984,040
FLOAT FOR ADJUSTING FISHING DEPTH
Louis A. Fogaley, 1036 S. Garnett Road, Tulsa, Okla.
Filed Apr. 6, 1959, Ser. No. 804,434
7 Claims. (Cl. 43—43.11)

This invention refers to a fishing float of the type used in cast-fishing wherein the depth to which the sinker will descend below the surface of the water can be preset.

Effective fishing requires the depth at which the bait is to be exposed to the fish to be determined accurately. The optimum depth of fishing of is influenced by such factors as the total depth of the water, the temperature of the water, the type fish sought, and other variables well known to fishermen. Ordinarily, the float is secured to the line a selected distance from the sinker or bait. This procedure makes it difficult to cast the bait, especially at great depths, since the float is secured to the line. Accordingly, reeling of the bait and sinker to the end of the casting rod is limited or stopped when the secured float engages with the fishing line guide ring at the end of the rod.

One method of overcoming this difficulty is to provide a float having a hole through which the fishing line passes. The fisherman ties a knot in the line at the point of depth from float to hook desired. The line is pulled through the float by the weight of the bait and sinker after striking the surface of the water. This procedure is unsatisfactory in that it requires the knot to be untied and then retied on each occasion as the fishing depth is changed.

Others in this field have provided float means for presetting the depth of fishing. But their devices have limitations such as not being able to adjust the depth readily and accurately using mechanism externally to the float. In other devices the depth is adjusted in steps, or the device is relatively complicated and expensive to manufacture.

Accordingly, it is an object of this invention to overcome the objections to prior art devices.

A further object of my invention is to provide a float having means whereby the depth to which the sinker will descend below the float can be preset.

A further object of my invention is to provide a float wherein the depth to which the sinker will descend below the float can be rapidly and easily adjusted.

A further object of my invention is to provide a float of the character referred to which wil be inexpensive to produce and which will be substantially trouble free to the user.

These and other objects and features of my invention will become apparent from the following descriptions and claims, taken in conjunction with the accompanying drawings in which:

Figure 1 is an elevation view of the float showing its position on the fishing line.

Figure 2 is a sectional elevation of the float taken along the line 2—2 in Figure 1.

Figure 3 is a sectional elevation of the float taken along the line 3—3 in Fig. 2.

Figure 4 is a portion of Figure 2, showing an alternate arrangement of the selector device.

Figure 5 is a sectional view of the pulley taken along the line 5—5 in Figure 3.

Description

Referring now to Figure 1, the float 10 is shown at its relative position on the fishing line 12 above the sinker 14 and fishhook 16. Depth selector knob 18, located outside the body, allows adjustment of the depth the sinker 14 and fishhook 16 will descend. A depth selector scale 20 is imprinted upon the float 10.

Referring now to Figure 2 and Figure 3, the internal mechanism of the invention is depicted. The body of the float 10 is composed of two float halves 22 and 24, which can be made of synthetic resins or any similar material capable of being easily shaped or moulded. Each of the float halves 22 and 24 contain air chambers 28 and 26, respectively. These are sealed to prevent the admission of air or water, and to impart buoyancy to the float. The depth adjusting mechanism of this invention is located within the float halves 22 and 24 and below the air chambers 26 and 28.

The fishing line 12 passes through a guide 30 in the top of the float 10 and is in frictional engagement with pulley 32, as, for example, by wrapping at least once around the circumference of a pulley 32 and thence out the bottom of the float 10 through a guide 34. As the fishing line 12 is moved up or down through the float 10 the pulley 32 is caused to rotate by the friction of the fishing line 12 upon the circumference of the pulley 32.

A continuous spiral groove 36, similar to the groove of a phonograph record, is formed on one face of the pulley 32 substantially perpendicular to its axis. Near the outer periphery of the pulley 32 is a stop point 38 which is the outer termination of the spiral groove 36. A needle-like point or follower 40 is supported adjacent the spiral groove 36 by arm 42. As the fishing line 12 moves downward through the float 10, pulley 32 is rotated, moving the needle 40 toward the periphery of the pulley 32 by action of the spiral groove 36 until engagement with stop 38. When the stop 38 hits the needle 40 the rotation of the pulley 32 will be stopped, thus stopping the descent of the fishing line 12 through float 10. The length of the fishing line 12 passing through the float 10 is determined by the distance the needle 40 is positioned away from the peripherial stop notch when the downward motion of the fishing line 12 is started.

Tubular pulley supports 44 and 46, either moulded as an integral part of the float halves 22 and 24, or otherwise affixed as by adhesive, are provided. Pulley shaft 48 is pressed into and becomes permanently affixed within the tubular pulley support 46. The pulley 32 is loosely mounted on the pulley shaft 48 and is free to rotate thereon. Pulley support 44 fits over the pulley shaft 48 loosely, supporting the pulley shaft 48, but permitting the float half 22 to be easily removed. A screw 50 engaging internally tapped threads 52 in the end of the pulley shaft 48 serves to hold both float halves 22 and 24 securely in place while the float 10 is in use. Interlocking of float halves 22 and 24 prevents rotation of one with respect to the other.

Depth selector shaft support 54 is cast integrally with the float half 24, or otherwise affixed as by adhesive. Depth selector shaft 56 is loosely fitted and free to turn within the depth selector shaft support and flange 54. The depth selector shaft 56 terminates at one end by connection with needle arm 42. The other end of the depth selector shaft 56 has internally tapped low-tolerance threads 58 into which the depth selector knob 18 is tightly screwed. A spring 60 is fitted around the depth selector shaft 56 and compressed between the perpendicular termination of the depth selector shaft support 54 and the depth selector knob 18. The force of the spring 60, as transmitted to the needle 40 by the depth selector shaft 56 and the needle arm 42, is sufficient to keep the needle 40 in the spiral groove 36 during operation but permits movement of the needle arm 42 as it is impelled toward and away from the center of the pulley 32 by the action of the spiral groove 36. In one embodiment the tension restraining the needle 40 within the spiral groove 36 may be adjusted by screwing the depth selector knob 18 into or out of the depth selector shaft 56, thus varying the compression of the spring 60. Such adjustment is made without affecting the relationship of knob 18 and scale 20.

Fig. 4 shows an alternate arrangement of the depth selecting mechanism. In this arrangement the spiral groove 36 is on the opposite face of the pulley 32 from the arrangement shown in Figure 2. The needle 40 is supported by needle arm 42 and depth selector shaft 56. Spring 60 is fitted around the depth selector shaft 56 and compressed between the perpendicular termination of the selector shaft support 54 and the needle arm 42. The force of the spring 60 as transmitted to the needle 40 by the needle arm 42 is sufficient to keep the needle 40 in the spiral groove 36 during operation but permits movement of the needle arm 42 as it is impelled toward and away from the center of the pulley 32 by the action of the spiral groove 36.

Figure 5 is a cross-sectional view of the pulley 32 showing greater detail of spiral groove 36 and the stop notch 38. Although a recessed point in the pulley 32 is shown, a protrusion terminating the spiral groove 36 would serve as the stop notch 38 equally as well. The recessed periphery 62 serves to keep the fishing line 12 on the pulley 32 during operation.

Operation

The float 10 is operated in the following manner: When the fisherman lifts the fishhook 16 from the water, the float 10 runs down the fishing line 12 until it comes to rest against the sinker 14. Before making the next cast the fisherman adjusts the float 10 to the depth he desires to fish. This is accomplished by depressing the depth selector knob 18 a slight distance, compressing the spring 60 and through lateral movement of the depth selector shaft 56 and needle arm 42 the needle 40 is disposed out of the spiral groove 36. In this depressed position the depth selector knob 18 can be rotated to the point on the depth selector scale 20 indicating the depth desired. When the depth selector knob 18 is released the needle 40 is impressed into the spiral groove 36 by the compression of spring 60. When the fishhook 16, sinker 14, and float 10 are cast into the water, the weight of the sinker 14 pulls the fishing line 12 down through the float 10, which remains on the water surface supported by the buoyancy of the air chambers 26 and 28. As the fishing line 12 descends through the float 10, the pulley 32 is rotated by the friction of the fishing line 12, moving the needle 40 in the spiral groove 36 towards the stop notch 38. When the stop notch 38 encounters the needle 40, the rotation of the pulley 32 is terminated, thus stopping the descent of the fishing line 12. The float 10 is so calibrated that a length of fishing line 12 as selected on the depth scale 20 must pass through the float 10 before the pulley 32 rotates the spiral groove 36 to the point where the stop notch 38 engages the needle 40.

When the fishhook 16 is reeled in by the fisherman the fishing line 12 passes up through the float 10 rotating the pulley 32 in the direction opposite to that when the float 10 descends, moving the needle 40 away from the stop notch 38 and toward the center of the pulley 32. Thus the fishhook 16 may be reeled in and recast into the water repeatedly, descending each time to the depth originally selected on the depth selector scale 20. After making several casts at one selected depth, a new depth can easily be selected simply by depressing the depth selector knob 18 and turning it to the next desired depth.

The operation of the alternate arrangement of the depth selecting mechanism differs only in that the depth selector knob 18 is pulled by the operator rather than depressed to select a different fishing depth. When the depth selector knob 18 is pulled, the lateral movement is transmitted by the depth selector shaft 56 and needle arm 42, pulling the needle 40 out of the spiral groove 36. In this pulled position the depth selector knob 18 may be rotated to a new fishing depth as selected on the depth selector scale 20. When the depth selector knob 18 is released the compressive tension of spring 60 forces the needle into the spiral groove 36.

Although I have described my invention with a certain degree of particularity, it is understood that the present disclosure has been made only by way of example and that numerous changes in the details of construction and the combination and arrangement of parts may be resorted to without departing from the spirit of the invention. For example, movement of needle 40 in grooves 36 may progress from the outside toward the inside of pulley 32 with an appropriate stop notch there located. Accordingly, this invention should be construed not to be limited to the embodiment herein described, but should be limited only by the scope of the appended claims.

I claim:

1. A float for fishing a pre-determined distance below the water surface adapted for effective depth adjustment of an associated line comprising, in combination, a hollow, bifurcated float body having a transverse guide for passage of said line through the body; a buoyancy chamber in each half of said float body; a pulley having faces substantially perpendicular to its axis and a recessed peripheral edge at its circumference adapted for receiving at least one loop of said line around the pulley, a spiral groove in one face of the pulley, said spiral groove having its axis coincident with the axis of the pulley, and a stop point at the peripheral extremity of said spiral groove; pulley supports affixed to each half of said float body; a pulley shaft supported by each of said pulley supports upon which said pulley is rotatably mounted; a depth selector shaft support having a flange at one end affixed to said float body at its other end; a depth selector shaft rotatably mounted in said depth selector shaft support; a needle arm affixed perpendicularly to one end of said depth selector shaft; a needle affixed to said needle arm and disposed so that the point of said needle engages said spiral groove in said pulley; a depth selector knob affixed to said depth selector shaft external to the said float body whereby said needle may be extracted from said spiral groove by depressing the depth selector knob and adjusted in a variety of positions in said spiral groove; a spring compressibly mounted around said depth selector shaft between said depth selector shaft support flange and said depth selector knob whereby said needle is restrained within said spiral groove; and a depth scale imprinted upon said float body whereby said depth selector knob is moved relative to said scale corresponding to the desired depth of said line before termination of travel of said line by said stop point striking said needle.

2. A float for fishing a pre-determined distance below the water surface adapted for effective adjustment of an associated line comprising, in combination, a hollow bifurcated float body having a transverse guide for passage of said line through the body; a buoyancy chamber in each half of said float body, a pulley having faces substantially perpendicular to its axis and a recessed peripheral edge at its circumference adapted for receiving at least one loop of said line around the pulley, a spiral groove in one face of the pulley, said spiral groove having its axis coincident with the axis of the pulley, and a stop point at the peripheral extremity of said spiral groove; pulley supports affixed to each half of said float body; a pulley shaft supported by each of said pulley supports upon which said pulley is rotatably mounted; a depth selector shaft support affixed to one half of said float body; a depth selector shaft rotatably mounted in said depth selector shaft support; a needle arm affixed perpendicularly to one end of said depth selector shaft; a needle affixed to said needle arm and disposed so that the point of said needle engages said spiral groove in said pulley; a spring compressibly mounted around said depth selector shaft between said float body and said needle arm whereby said needle is restrained within said spiral groove; a depth selector knob affixed to said depth selector shaft external to said float body whereby said needle may be extracted from said spiral groove by pulling the depth selector knob and adjusted in a variety of positions in said spiral groove; and a depth scale imprinted upon said float body whereby said depth selector knob is moved relatively to said scale corresponding to the desired depth of said line before termination of travel of said line by said stop point striking said needle.

3. A float for fishing a pre-determined distance below the water surface adapted for effective depth adjustment of a line comprising, in combination, a buoyant body; a guide for passage of said line through said body; a pulley having faces substantially perpendicular to its axis and rotatably mounted in said body adjacent the said guide adapted for frictional contact with said line to rotate as said line passes through said float, said pulley having a spiral groove in one of said faces, said spiral groove having its axis coincident with the axis of the pulley, and a stop at one extremity of said spiral groove; a needle pivotably mounted within said body disposed to engage said spiral groove and terminate rotation of said pulley when said stop strikes the needle; and means of adjustably positioning said needle in said spiral groove.

4. A device according to claim 3 wherein said pulley has a recessed peripheral edge.

5. A device according to claim 3 wherein said means of positioning said needle in said spiral groove includes external means.

6. A device according to claim 3 wherein said frictional contact of said line with said pulley includes looping said line around the peripheral edge of said pulley at least once.

7. A float for fishing a pre-determined distance below the water surface adapted for effective depth adjustment of an associated line comprising, in combination, a hollow, bifurcated float body having a guide for passage of said line through the body; means of imparting buoyancy to said float; a pulley rotatably mounted in said body disposed to make frictional contact with said line and having faces substantially perpendicular to its axis, a spiral groove in one of said faces, said spiral groove having its axis coincident with axis of said pulley; a stop point at one extremity of said spiral groove; a needle pivotably mounted within said float disposed to engage said spiral groove and terminate the rotation of said pulley when said stop point encounters the needle; and means to adjust said needle in a multiplicity of positions in said spiral groove.

References Cited in the file of this patent
UNITED STATES PATENTS

| | | |
|---|---|---|
| 2,177,697 | Fairbanks et al. | Oct. 31, 1939 |
| 2,646,643 | Nordlund | July 28, 1953 |